(12) United States Patent  
Barve et al.

(10) Patent No.: US 8,549,424 B2
(45) Date of Patent: Oct. 1, 2013

(54) SYSTEM AND METHOD FOR TEXT DISAMBIGUATION AND CONTEXT DESIGNATION IN INCREMENTAL SEARCH

(75) Inventors: Rakesh Barve, Bangalore (IN); Sashikumar Venkataraman, Andover, MA (US); Murali Aravamudan, Windham, NH (US); Manish M. Sharma, Ghaziabad (IN); Pankaj Garg, Patiala (IN); Sankar Ardhanari, Windham, NH (US)

(73) Assignee: Veveo, Inc., Andover, MA (US)

( * ) Notice: Subject to any disclaimer, the term of this patent is extended or adjusted under 35 U.S.C. 154(b) by 1053 days.

(21) Appl. No.: 12/126,549

(22) Filed: May 23, 2008

(65) Prior Publication Data

US 2008/0313564 A1  Dec. 18, 2008

Related U.S. Application Data

(60) Provisional application No. 60/940,244, filed on May 25, 2007.

(51) Int. Cl.
G06F 3/048 (2013.01)

(52) U.S. Cl.
USPC ............................ 715/773; 715/780; 715/816

(58) Field of Classification Search
USPC .......................... 715/816, 822–823, 773, 780
See application file for complete search history.

(56) References Cited

U.S. PATENT DOCUMENTS

| 1,261,167 | A | 4/1918 | Russell |
| 4,453,217 | A | 6/1984 | Boivie |
| 4,760,528 | A | 7/1988 | Levin |
| 4,797,855 | A | 1/1989 | Duncan, IV et al. |
| 4,893,238 | A | 1/1990 | Venema |
| 5,224,060 | A | 6/1993 | Ma et al. |

(Continued)

FOREIGN PATENT DOCUMENTS

| EA | 1050794 | 11/2000 |
| EP | 181058 | 5/1986 |

(Continued)

OTHER PUBLICATIONS

European Supplemental Search Report for PCT/US2005040415, dated Aug. 11, 2009, 15 pages.

(Continued)

*Primary Examiner* — Ramsey Refai
*Assistant Examiner* — William Titcomb
(74) *Attorney, Agent, or Firm* — Wilmer Cutler Pickering Hale & Dorr LLP

(57) ABSTRACT

Methods and systems for text disambiguation and context designation in incremental search are provided. A method for selecting items in response to ambiguous keystrokes entered by a user and unambiguous metadata associated with a previously selected search result includes receiving ambiguous keystrokes, selecting and presenting a first subset of items and metadata associated with the items presented based on the ambiguous keystrokes. The method also includes receiving a selection of one of the items from the user, and, in response to a locking operation received from the user, locking in fixed relation at least one of the ambiguous keystrokes to at least one metadata term associated with the selected item. The method further includes, subsequent to receiving the locking operation, selecting and presenting a second subset of items based at least in part on the locked metadata term, and presenting the second subset of items.

14 Claims, 6 Drawing Sheets

(56) References Cited

U.S. PATENT DOCUMENTS

| | | |
|---|---|---|
| 5,337,347 A | 8/1994 | Halstead-Nussloch et al. |
| 5,369,605 A | 11/1994 | Parks |
| 5,487,616 A | 1/1996 | Ichbiah |
| 5,532,754 A | 7/1996 | Young et al. |
| 5,623,406 A | 4/1997 | Ichbiah |
| 5,635,989 A | 6/1997 | Rothmuller |
| 5,774,588 A | 6/1998 | Li |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,835,087 A | 11/1998 | Herz et al. |
| 5,859,662 A | 1/1999 | Cragun et al. |
| 5,880,768 A | 3/1999 | Lemmons et al. |
| 5,896,444 A | 4/1999 | Perlman et al. |
| 5,912,664 A | 6/1999 | Eick et al. |
| 5,930,788 A | 7/1999 | Wical |
| 5,937,422 A | 8/1999 | Nelson et al. |
| 5,945,928 A | 8/1999 | Kushler et al. |
| 5,945,987 A | 8/1999 | Dunn |
| 5,953,541 A | 9/1999 | King et al. |
| 6,005,565 A | 12/1999 | Legall et al. |
| 6,005,597 A | 12/1999 | Barrett et al. |
| 6,006,225 A | 12/1999 | Bowman et al. |
| 6,008,799 A | 12/1999 | Van Kleeck |
| 6,009,459 A | 12/1999 | Belfiore et al. |
| 6,011,554 A | 1/2000 | King et al. |
| 6,047,300 A | 4/2000 | Walfish et al. |
| 6,075,526 A | 6/2000 | Rothmuller |
| 6,133,909 A | 10/2000 | Schein et al. |
| 6,184,877 B1 | 2/2001 | Dodson et al. |
| 6,189,002 B1 | 2/2001 | Roitblat |
| 6,204,848 B1 * | 3/2001 | Nowlan et al. ............... 715/810 |
| 6,223,059 B1 | 4/2001 | Haestrup et al. |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,307,548 B1 | 10/2001 | Flinchem et al. |
| 6,307,549 B1 | 10/2001 | King et al. |
| 6,360,215 B1 | 3/2002 | Judd et al. |
| 6,377,945 B1 | 4/2002 | Risvik et al. |
| 6,383,080 B1 | 5/2002 | Link et al. |
| 6,392,640 B1 | 5/2002 | Will |
| 6,438,751 B1 | 8/2002 | Voyticky et al. |
| 6,463,586 B1 | 10/2002 | Jerding |
| 6,466,933 B1 | 10/2002 | Huang et al. |
| 6,529,903 B2 | 3/2003 | Smith et al. |
| 6,543,052 B1 | 4/2003 | Ogasawara |
| 6,564,213 B1 | 5/2003 | Ortega et al. |
| 6,564,313 B1 | 5/2003 | Kashyap |
| 6,594,657 B1 | 7/2003 | Livowsky et al. |
| 6,600,496 B1 | 7/2003 | Wagner et al. |
| 6,614,422 B1 | 9/2003 | Rafii et al. |
| 6,614,455 B1 | 9/2003 | Cuijpers et al. |
| 6,615,248 B1 | 9/2003 | Smith |
| 6,622,148 B1 * | 9/2003 | Noble et al. ............... 707/792 |
| 6,664,980 B2 | 12/2003 | Bryan et al. |
| 6,708,336 B1 | 3/2004 | Bruette |
| 6,721,954 B1 | 4/2004 | Nickum |
| 6,732,369 B1 | 5/2004 | Leftwich et al. |
| 6,734,881 B1 * | 5/2004 | Will ............................. 715/811 |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,835,602 B2 | 12/2004 | Norskov et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith et al. |
| 6,865,746 B1 | 3/2005 | Herrington et al. |
| 6,907,273 B1 | 6/2005 | Smethers |
| 6,965,374 B2 | 11/2005 | Villet et al. |
| 6,999,959 B1 | 2/2006 | Lawrence et al. |
| 7,013,304 B1 | 3/2006 | Schuetze et al. |
| 7,117,207 B1 | 10/2006 | Kerschberg et al. |
| 7,136,854 B2 | 11/2006 | Smith |
| 7,149,983 B1 | 12/2006 | Robertson et al. |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |
| 7,293,231 B1 | 11/2007 | Gunn et al. |
| 7,461,061 B2 | 12/2008 | Aravamudan et al. |
| 7,509,313 B2 | 3/2009 | Colledge et al. |
| 7,529,744 B1 | 5/2009 | Srivastava et al. |
| 7,536,384 B2 | 5/2009 | Venkataraman et al. |
| 7,539,676 B2 | 5/2009 | Aravamudan et al. |
| 7,548,915 B2 | 6/2009 | Ramer et al. |
| 7,644,054 B2 | 1/2010 | Garg et al. |
| 7,657,526 B2 | 2/2010 | Aravamudan et al. |
| 7,679,534 B2 * | 3/2010 | Kay et al. ................... 341/22 |
| 7,683,886 B2 * | 3/2010 | Willey ......................... 345/169 |
| 7,712,053 B2 * | 5/2010 | Bradford et al. ............. 715/864 |
| 7,779,011 B2 | 8/2010 | Venkataraman et al. |
| 7,788,266 B2 | 8/2010 | Venkataraman et al. |
| 2002/0002550 A1 | 1/2002 | Berman |
| 2002/0042791 A1 | 4/2002 | Smith et al. |
| 2002/0049752 A1 | 4/2002 | Bowman et al. |
| 2002/0052873 A1 | 5/2002 | Delgado et al. |
| 2002/0059066 A1 | 5/2002 | O'Hagan |
| 2002/0059621 A1 | 5/2002 | Thomas et al. |
| 2002/0077143 A1 | 6/2002 | Sharif et al. |
| 2002/0083448 A1 | 6/2002 | Johnson |
| 2002/0133481 A1 | 9/2002 | Smith et al. |
| 2002/0184373 A1 | 12/2002 | Maes |
| 2002/0188488 A1 | 12/2002 | Hinkle |
| 2002/0199194 A1 | 12/2002 | Ali |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014753 A1 | 1/2003 | Beach et al. |
| 2003/0023976 A1 | 1/2003 | Kamen et al. |
| 2003/0033292 A1 | 2/2003 | Meisel et al. |
| 2003/0037043 A1 | 2/2003 | Chang et al. |
| 2003/0046698 A1 | 3/2003 | Kamen et al. |
| 2003/0066079 A1 | 4/2003 | Suga |
| 2003/0067495 A1 | 4/2003 | Pu et al. |
| 2003/0084270 A1 | 5/2003 | Coon et al. |
| 2003/0097661 A1 | 5/2003 | Li et al. |
| 2003/0226146 A1 | 12/2003 | Thurston et al. |
| 2003/0237096 A1 | 12/2003 | Barrett et al. |
| 2004/0021691 A1 | 2/2004 | Dostie et al. |
| 2004/0046744 A1 | 3/2004 | Rafii et al. |
| 2004/0049783 A1 | 3/2004 | Lemmons et al. |
| 2004/0073432 A1 | 4/2004 | Stone |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0111745 A1 | 6/2004 | Schein et al. |
| 2004/0128686 A1 | 7/2004 | Boyer et al. |
| 2004/0139091 A1 | 7/2004 | Shin |
| 2004/0143569 A1 | 7/2004 | Gross et al. |
| 2004/0194141 A1 | 9/2004 | Sanders |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0071874 A1 | 3/2005 | Elcock et al. |
| 2005/0079895 A1 * | 4/2005 | Kalenius et al. ............ 455/566 |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0129199 A1 | 6/2005 | Abe |
| 2005/0174333 A1 | 8/2005 | Robinson et al. |

| | | | |
|---|---|---|---|
| 2005/0192944 A1 | 9/2005 | Flinchem | |
| 2005/0210020 A1 | 9/2005 | Gunn et al. | |
| 2005/0210383 A1 | 9/2005 | Cucerzan et al. | |
| 2005/0210402 A1 | 9/2005 | Gunn et al. | |
| 2005/0223308 A1 | 10/2005 | Gunn et al. | |
| 2005/0240580 A1 | 10/2005 | Zamir et al. | |
| 2005/0246311 A1 | 11/2005 | Whelan et al. | |
| 2005/0246324 A1* | 11/2005 | Paalasmaa et al. | 707/3 |
| 2005/0278175 A1 | 12/2005 | Hyvonen | |
| 2005/0283468 A1 | 12/2005 | Kamvar et al. | |
| 2006/0010477 A1 | 1/2006 | Yu | |
| 2006/0013487 A1 | 1/2006 | Longe et al. | |
| 2006/0015906 A1 | 1/2006 | Boyer et al. | |
| 2006/0036640 A1 | 2/2006 | Tateno et al. | |
| 2006/0044277 A1 | 3/2006 | Fux et al. | |
| 2006/0059044 A1 | 3/2006 | Chan et al. | |
| 2006/0069616 A1 | 3/2006 | Bau | |
| 2006/0075429 A1 | 4/2006 | Istvan et al. | |
| 2006/0090182 A1 | 4/2006 | Horowitz et al. | |
| 2006/0090185 A1 | 4/2006 | Zito et al. | |
| 2006/0098899 A1 | 5/2006 | King et al. | |
| 2006/0101499 A1 | 5/2006 | Aravamudan et al. | |
| 2006/0101503 A1 | 5/2006 | Venkataraman | |
| 2006/0101504 A1 | 5/2006 | Aravamudan et al. | |
| 2006/0112162 A1 | 5/2006 | Marot et al. | |
| 2006/0136379 A1 | 6/2006 | Marino et al. | |
| 2006/0156233 A1 | 7/2006 | Nurmi | |
| 2006/0161520 A1 | 7/2006 | Brewer et al. | |
| 2006/0163337 A1 | 7/2006 | Unruh | |
| 2006/0167676 A1 | 7/2006 | Plumb | |
| 2006/0167859 A1* | 7/2006 | Verbeck Sibley et al. | 707/3 |
| 2006/0176283 A1* | 8/2006 | Suraqui | 345/169 |
| 2006/0190308 A1 | 8/2006 | Janssens et al. | |
| 2006/0195435 A1 | 8/2006 | Laird-McConnell et al. | |
| 2006/0206454 A1 | 9/2006 | Forstall et al. | |
| 2006/0206815 A1* | 9/2006 | Pathiyal et al. | 715/533 |
| 2006/0242607 A1* | 10/2006 | Hudson | 715/863 |
| 2006/0248078 A1 | 11/2006 | Gross et al. | |
| 2006/0256078 A1 | 11/2006 | Flinchem et al. | |
| 2006/0259479 A1 | 11/2006 | Dai | |
| 2006/0274051 A1 | 12/2006 | Longe et al. | |
| 2007/0005563 A1 | 1/2007 | Aravamudan | |
| 2007/0016476 A1 | 1/2007 | Hoffberg et al. | |
| 2007/0016862 A1* | 1/2007 | Kuzmin | 715/700 |
| 2007/0027852 A1 | 2/2007 | Howard et al. | |
| 2007/0043750 A1 | 2/2007 | Dingle | |
| 2007/0050337 A1 | 3/2007 | Venkataraman et al. | |
| 2007/0050348 A1 | 3/2007 | Aharoni et al. | |
| 2007/0061244 A1 | 3/2007 | Ramer et al. | |
| 2007/0061317 A1* | 3/2007 | Ramer et al. | 707/4 |
| 2007/0061321 A1 | 3/2007 | Venkataraman | |
| 2007/0061753 A1* | 3/2007 | Ng et al. | 715/816 |
| 2007/0061754 A1 | 3/2007 | Ardhanari et al. | |
| 2007/0074131 A1* | 3/2007 | Assadollahi | 715/816 |
| 2007/0088681 A1 | 4/2007 | Aravamudan et al. | |
| 2007/0094024 A1* | 4/2007 | Kristensson et al. | 704/252 |
| 2007/0130128 A1 | 6/2007 | Garg et al. | |
| 2007/0136689 A1* | 6/2007 | Richardson-Bunbury et al. | 715/816 |
| 2007/0143567 A1 | 6/2007 | Gorobets | |
| 2007/0150606 A1 | 6/2007 | Flinchem et al. | |
| 2007/0182595 A1* | 8/2007 | Ghasabian | 341/22 |
| 2007/0219984 A1 | 9/2007 | Aravamudan et al. | |
| 2007/0219985 A1 | 9/2007 | Aravamudan et al. | |
| 2007/0226649 A1* | 9/2007 | Agmon | 715/816 |
| 2007/0240044 A1* | 10/2007 | Fux et al. | 715/533 |
| 2007/0240045 A1* | 10/2007 | Fux et al. | 715/533 |
| 2007/0255693 A1 | 11/2007 | Ramaswamy et al. | |
| 2007/0260703 A1 | 11/2007 | Ardhanari et al. | |
| 2007/0266021 A1 | 11/2007 | Aravamudan et al. | |
| 2007/0266026 A1 | 11/2007 | Aravamudan et al. | |
| 2007/0266406 A1 | 11/2007 | Aravamudan et al. | |
| 2007/0271205 A1 | 11/2007 | Aravamudan et al. | |
| 2007/0276773 A1 | 11/2007 | Aravamudan et al. | |
| 2007/0276821 A1 | 11/2007 | Aravamudan et al. | |
| 2007/0276859 A1 | 11/2007 | Aravamudan et al. | |
| 2007/0288457 A1 | 12/2007 | Aravamudan et al. | |
| 2008/0010611 A1* | 1/2008 | Fux et al. | 715/816 |
| 2008/0065617 A1 | 3/2008 | Burke et al. | |
| 2008/0071771 A1 | 3/2008 | Venkataraman et al. | |
| 2008/0077577 A1 | 3/2008 | Byrne et al. | |
| 2008/0086704 A1 | 4/2008 | Aravamudan | |
| 2008/0114743 A1 | 5/2008 | Venkataraman et al. | |
| 2008/0177717 A1 | 7/2008 | Kumar et al. | |
| 2008/0195601 A1 | 8/2008 | Ntoulas et al. | |
| 2008/0209229 A1 | 8/2008 | Ramakrishnan et al. | |
| 2008/0313564 A1 | 12/2008 | Barve et al. | |
| 2009/0077496 A1 | 3/2009 | Aravamudan et al. | |
| 2009/0198688 A1 | 8/2009 | Venkataraman et al. | |
| 2010/0121845 A1 | 5/2010 | Aravamudan et al. | |
| 2010/0153380 A1 | 6/2010 | Garg et al. | |

FOREIGN PATENT DOCUMENTS

| | | |
|---|---|---|
| EP | 1143691 | 10/2001 |
| EP | 1338967 | 8/2003 |
| EP | 1463307 | 9/2004 |
| EP | 1622054 | 2/2006 |
| WO | WO-98/56173 | 12/1998 |
| WO | WO-0070505 | 11/2000 |
| WO | WO-2004010326 | 1/2004 |
| WO | WO-2004/031931 A1 | 4/2004 |
| WO | WO-2005/033967 A3 | 4/2005 |
| WO | WO-2005/084235 A2 | 9/2005 |
| WO | WO-2006/052959 | 5/2006 |
| WO | WO-2006/052966 | 5/2006 |
| WO | WO-2007/025148 | 3/2007 |
| WO | WO-2007/025149 | 3/2007 |
| WO | WO-2007/062035 | 5/2007 |
| WO | WO-2007/118038 | 10/2007 |
| WO | WO-2007/124429 | 11/2007 |
| WO | WO-2007/124436 A2 | 11/2007 |
| WO | WO-2007/131058 | 11/2007 |
| WO | WO-2008/034057 | 3/2008 |
| WO | WO-2008/091941 | 7/2008 |
| WO | WO-2008/148012 | 12/2008 |

OTHER PUBLICATIONS

Supplemental European Search Report for PCT/US2005040424, dated Aug. 20, 2009, 13 pages.
Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251.
Supplemental European Search Report for 06838179.7 dated Dec. 9, 2009, 7 pages.
Supplemental European Search Report for EP07761026.9 dated Jan. 28, 2010, 8 pages.
Turski, et al., "Inner Circle—People Centered Email Client," CHI 2005 Conference on Human Factors in Computing Sysems, Apr. 2005, pp. 1845-1848, 4 pages, retrieved from URL:http://portal.acm.org/citation.cfm?id+1056808.1057037.
Mackenzie et al., LetterWise: Prefix-based disambiguation for mobile text input, Proceedings of the ACM Symposium on User Interface Software and Technology—UIST2001, pp. 111-120.
Matthom, "Text Highlighting in Search Results", Jul. 22, 2005. Available at www.matthom.com/archive/2005/07/22/text-highlighting-in-search-results; retrieved Jun. 23, 2006. (4 pages).
Mokotoff, Soundexing and Genealogy, Available at http://www.avotaynu.com/soundex.html, retrieved Mar. 19, 2008, last updated Sep. 8, 2007 (6 pages).
Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242.
Review of Personalization Technologies: Collaborative Filtering vs. ChoiceStream's Attributized Bayesian Choice Modeling, Technology Brief, ChoiceStream Technologies, Cambridge, MA.
Silfverberg et al., Predicting text entry speed on mobile phones, Proceedings of the ACM Conference on Human Factors in Computing System—Chi, 2000. pp. 1-16.
Talbot, David. "Soul of a New Mobile Machine." *Technology Review: The Design Issue* May/Jun. 2007. (pp. 46-53).
Wikipedia's entry for Levenshtein distance (n.d.). Retrieved Nov. 15, 2006 from http://en.wikipedia.org/wiki/Levenshtein_distance.

Written Opinion of the International Searching Authority, International Application No. PCT/US06/25249, mailed Jan. 29, 2008 (4 pages).

Written Opinion of the International Searching Authority, International Application No. PCT/US06/33204, mailed Sep. 21, 2007 (3 pages).

International Search Report and Written Opinion of the International Searching Authority of the United States Patent and Trademark Office for PCT/US2005/040415, dated Nov. 27, 2006, 4 pages.

International Search Report and Written Opinion of the International Searching Authority of the United States Patent and Trademark Office for PCT/US2006/033257, dated Mar. 26, 2008, 5 pages.

International Search Report and Written Opinion of the International Searching Authority of the United States Patent and Trademark Office for PCT/US2006/045053, dated Jul. 24, 2008, 8 pages.

International Search Report and Written Opinion of the International Searching Authority of the United States Patent and Trademark Office for PCT/US2006/33258, dated Mar. 26, 2008, 5 pages.

International Search Report and Written Opinion of the International Searching Authority of the United States Patent and Trademark Office for PCT/US2007/067114, dated Jul. 2, 2008, 4 pages.

International Search Report and Written Opinion of the International Searching Authority of the United States Patent and Trademark Office for PCT/US2007/068064, 9 pages.

International Search Report and Written Opinion of the International Searching Authority of the United States Patent and Trademark Office for PCT/US2007/078490, 4 pages.

International Search Report and Written Opinion of the International Searching Authority of the United States Patent and Trademark Office for PCT/US2008/051789, dated Jul. 14, 2008, 5 pages.

International Search Report and Written Opinion of the International Searching Authority of the United States Patent and Trademark Office for PCT/US2008/064730, dated Sep. 8, 2008, 5 pages.

International Search Report and Written Opinion of the International Searching Authority, the United States Patent and Trademark Office, for PCT/US2005/40424, mailing date of Nov. 21, 2006, 6 pages.

Roe, et al., "Mapping UML Models Incorporating OCL Constraints into Object-Z," Technical Report, Sep. 2003, Department of Computing, Imperial College London, retrieved on Jul. 12, 2007, retrieved from the internet: <URL: http://www.doc.ic.ac.uk/-ar3/TechnicalReport2003_9.pdf>, 17 pages.

Supplementary European Search Report and Written Opinion for EP07842499, dated Aug. 25, 2010, 6 pages.

U.S. Appl. No. 11/939,086, Ramakrishnan et al.

Ardissono, L. et al., User Modeling and Recommendation Techniques for Personalized Electronic Program Guides, Personalized Digital Television, Editors: Ardissono, et al., Kluwer Academic Press, 2004.

Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml.

Digital Video Broadcasting, http://www.dvb.org (Oct. 12, 2007).

Gadd, Phonix: The Algorith, Program, vol. 24(4), Oct. 1990 (pp. 363-369).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report, International Application No. PCT/US06/25249, mailed Jan. 29, 2008 (2 pages).

International Search Report, International Application No. PCT/US06/33204, mailed Sep. 21, 2007 (2 pages).

International Search Report, International Application No. PCT/US06/40005, mailed Jul. 3, 2007 (4 Pages).

International Search Report, International Application No. PCT/US07/65703, mailed Jan. 25, 2008 (2 pages).

International Search Report, International Application No. PCT/US07/67100, mailed Mar. 7, 2008 (2 pages).

Written Opinion of the International Searching Authority, International Application No. PCT/US06/40005, mailed Jul. 3, 2007 (4 Pages).

Written Opinion of the International Searching Authority, International Application No. PCT/US07/65703, mailed Jan. 25, 2008 (4 pages).

Written Opinion of the International Searching Authority, International Application No. PCT/US07/67100, mailed Mar. 7, 2008 (3 pages).

* cited by examiner

SYSTEM AND METHOD FOR TEXT DISAMBIGUATION AND CONTEXT DESIGNATION IN INCREMENTAL SEARCH

CROSS-REFERENCE TO RELATED APPLICATIONS

This application claims the benefit under 35 U.S.C. §119(e) of the following application, the contents of which are incorporated by reference herein:

U.S. Provisional Application No. 60/940,244, entitled System and Method for Text Disambiguation and Context Designation in Incremental Search, filed May 25, 2007.

BACKGROUND

1. Field of the Invention

The present invention relates to user interfaces for searching and browsing and, more specifically, to user interfaces that are intended to operate on input-constrained devices and to provide relevant search results with a minimum of user interaction.

2. Discussion of Related Art

Discovery of desired content is not always simple as searching for a person, place or object and selecting the desired results. The user's intent may be deeper and broader, and retrieving the desired results might require more than merely providing more search terms. For example, a user may want to first discover a particular person, place, or entity, then browse through results in that context, and finally, make further refinements. In this case, the search system would need to be able to infer that the user is searching or browsing in a particular context, and serve content related to that context that satisfies the user's intent. A user progressively adding additional search terms may be misinterpreted as an attempt to intersect multiple interests rather than as a context based search. Some search engines have attempted to define specific grammars for users to specify a context search, but these grammars are often complex and idiosyncratic, and thus only experienced and advanced users can use them effectively. The expression and discovery of intent is further complicated by the possibility that a query may be entered using ambiguous keypad input (e.g., typed on a cellular phone using ambiguous keys).

SUMMARY OF THE INVENTION

The invention provides methods of and systems for text disambiguation and context designation in incremental search.

Under one aspect of the invention, a user-interface method for selecting a subset of items from a relatively large set of items in response to search criteria including ambiguous keystrokes entered by a user from a keypad with overloaded keys and including unambiguous metadata associated with a previously selected search result includes receiving ambiguous keystrokes entered by a user from a keypad with overloaded keys. A given key of the keypad is in fixed association with a plurality of alphabetical and numerical symbols the user is using to search for desired items. In response to receiving the ambiguous keystrokes, the method selects and presents a first subset of items and corresponding unambiguous metadata associated with the items presented based on the ambiguous keystrokes. The method also includes receiving a selection of one of the items of the first subset of items from the user, and, in response to a locking operation received from the user, locking in fixed relation at least one of the ambiguous keystrokes to at least one unambiguous metadata term associated with the selected item. The method further includes, subsequent to receiving the locking operation, selecting and presenting a second subset of items based at least in part on the locked unambiguous metadata term, and presenting the second subset of items.

Under another aspect of the invention, the unambiguous metadata term locked in fixed relation to the at least one of the ambiguous keystrokes is one of the presented metadata terms associated with the selected item of the first subset. The locked metadata term lexically disambiguates the items of the first subset from each other for the subsequent selecting and presenting step.

Under a further aspect of the invention, the unambiguous metadata term locked in fixed relation to the at least one of the ambiguous keystrokes is a metadata term describing a concept associated with the selected item of the first subset. Only items associated with the concept of the selected item are selected and presented in the subsequent selecting are presenting step.

Under yet another aspect of the invention, the method also includes receiving a browse action from the user for highlighting one of the presented items of the first subset. In response to the user browse action, the method transforms at least part of the ambiguous keystrokes into at least one unambiguous metadata term associated with the highlighted item At least some of the characters of the unambiguous metadata term match the alphabetical and numerical symbols in fixed association with the ambiguous keystrokes entered by the user.

Under a still further aspect of the invention, the receiving a selection of one of the items of the first subset of items includes receiving a browse action from the user for highlighting one of the presented items of the first subset. In addition, receiving a locking operation from the user includes receiving at least one additional keystroke entry from the user.

Under another aspect of the invention, the at least one additional keystroke entry from the user is a keystroke for performing an explicit lock operation.

Under yet another aspect of the invention, the at least one additional keystroke entry from the user includes additional ambiguous keystrokes entered by the user for providing additional alphabetical or numerical symbols for searching for desired items.

Under a further aspect of the invention, systems including logic for performing the methods above are provided.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION

Figure 1:
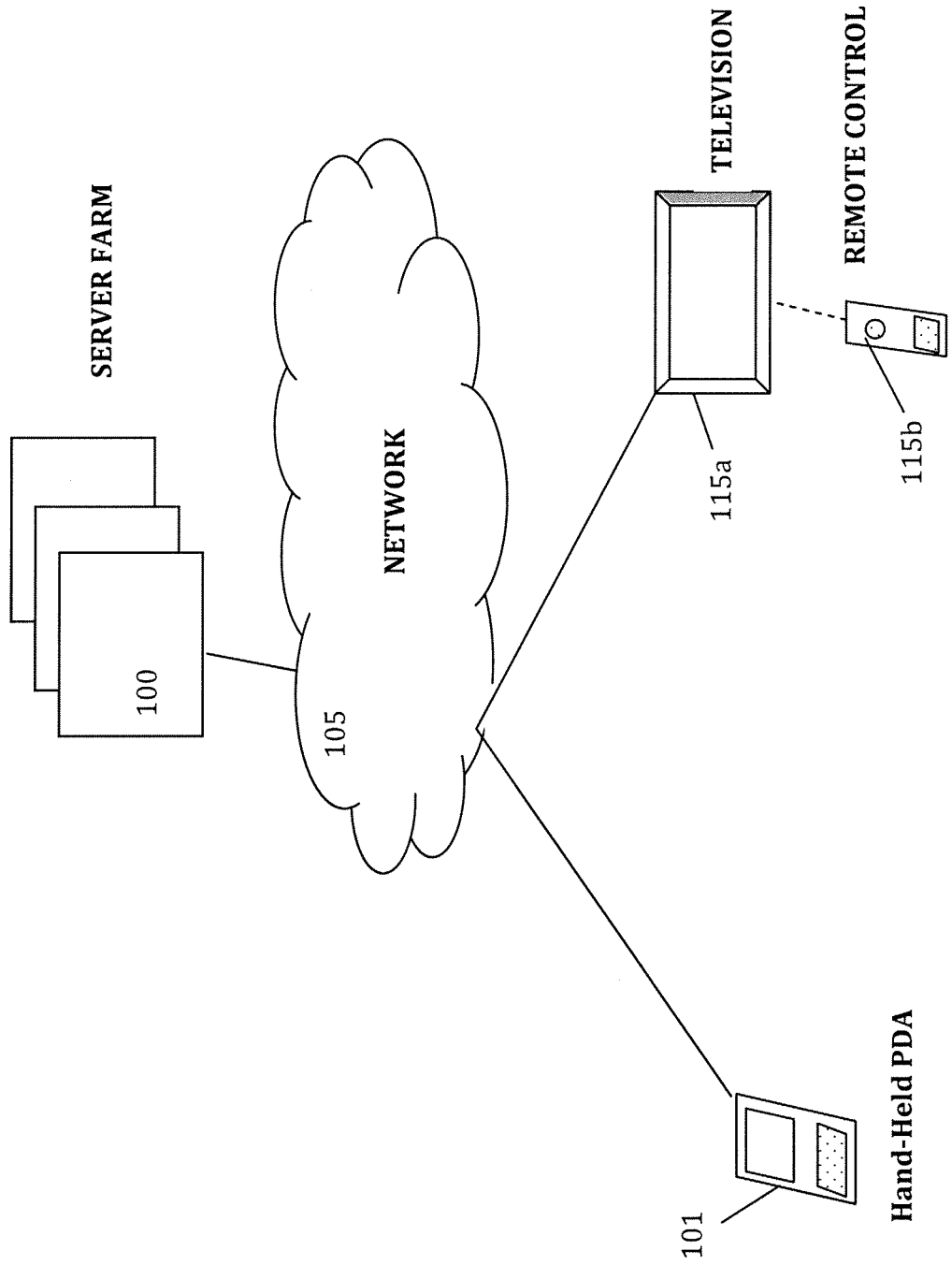
FIG. 1 is a network diagram that illustrates the various components of a search system, according to certain embodiments of the invention.

Embodiments of the invention described here enable a user to disambiguate otherwise ambiguous and/or incomplete text query entries based on terms and metacontent associated with search results that are determined by a search engine to be relevant to the user's query input. A user interface incorporating the techniques disclosed herein can use an ambiguous keypad (e.g., a keypad with overloaded keys) or an unambiguous keypad to receive a search query input from a user. The input query symbols may be, for example, single numeric characters (e.g., on an ambiguous keypad) or single text-alphabet characters (e.g., on an unambiguous QWERTY keypad). Embodiments of the invention can also be used with incremental search techniques, in which results are retrieved as each character is typed.

Techniques for selecting a set of results responsive to the user's query include, but are not limited to, those disclosed in U.S. patent application Ser. No. 11/235,928, entitled Method and System For Processing Ambiguous, Multi-Term Search Queries, filed Sep. 27, 2005, U.S. patent application Ser. No. 11/136,261, entitled Method and System For Performing Searches For Television Content Using Reduced Text Input, filed May 24, 2005, and U.S. patent application Ser. No. 11/246,432, entitled Method and System For Incremental Search With Reduced Text Entry Where The Relevance of Results is a Dynamically Computed Function of User Input Search String Character Count, filed Oct. 7, 2005, all of which are herein incorporated by reference. Similarly, lists of relevant results can be displayed using techniques disclosed in U.S. patent application Ser. No. 12/123,940, entitled Method and System for Search with Reduced Physical Interaction Requirements, filed on May 20, 2008, incorporated by reference herein.

While the user is composing a text query on an ambiguous keypad, the user's query, in general, can be said to be ambiguous (in the sense of the symbol being from an overloaded numeric keypad, where each key corresponds to a set containing more than one character, as is standard in cellular telephones) as well as incomplete (in the sense that one or more words in the query could be incomplete). For an illustration of ambiguous and incomplete queries and query-words, consider the following example. Suppose that the user's intended complete and unambiguous query is "engelbert humperdinck biggest hit." An incomplete but unambiguous version of the same query is "engel hump bigg hit" because the first three query-words in the latter query are prefixes of the respective first three query-words in the complete and unambiguous query. Similarly, an incomplete as well as ambiguous version of the same query would be entered by pressing the keys labeled "36435 4867 2444 448" (assuming this query is entered using a standard numeric keypad of the kind commonly found in telephones and/or television remote controls) because the query-words "36435," "4867," and "2444" are prefixes of the numeric versions of the first three query-words in the complete and unambiguous query. The words "humpback" and "humperdinck" both match the incomplete query-word "hump," because "hump" is a prefix of both the words. The words "humpback" and "humperdinck" both match the ambiguous and incomplete query-word "4867," because "4867" is an ambiguous prefix of the complete and ambiguous query-words "48672225" and "48673734625" (which match "humpback" and "humperdinck," respectively).

Preferred embodiments of the present invention address several usability problems. First, preferred embodiments allow users to press each key only once to enter a specific character, even if the key is associated with multiple characters (as on an overloaded keypad). Second, preferred embodiments permit users to type only a partial prefix of each search term. Finally, preferred embodiments allow for the progressive refinement of search queries in a context-sensitive way.

The techniques described herein provide methods for partially automated completion, disambiguation, and progressive refinement of search queries by using an iterative search-browse-select process. In most cases, this approach reduces the number of steps in reaching the desired result, by eliminating separate disambiguation and context-narrowing steps.

In a preferred embodiment of the present invention, the query system maintains four entities in a computer-readable data structure. The search-query is a data structure that contains the contents of the query input box in the user interface. The clone-query is a secondary query storage structure that allows the restoration of previous queries after the primary search-query has been changed. Unlike the search-query, the contents of the clone-query are not directly displayed to the user; this data structure is maintained by the search system for internal use. The context-list is a data structure that contains information that is used to limit the search space from which the search system will retrieve results. Finally, the result-list is a data structure that holds the results that the system has determined are relevant to the user's query and query context. The manipulation and use of these four structures is described in greater detail below.

The search-query contains a set of query terms, which may be either direct-input query terms or locked query terms. Direct-input query terms are those query terms (that could be incomplete and/or ambiguous) that have been input by the user using the keypad. Locked query-words are query terms that have been placed into the search-query automatically as a result of a "lock" operation. Lock operations are described in greater detail below, but in general, a locked query term is a word that the user interface has put into the search-query in place of a user-entered ambiguous and/or incomplete query term portion. These locked query terms can come from metacontent associated with a particular search result returned by a search engine.

FIG. 1 illustrates the various components of a search system, according to certain embodiments of the invention. A server farm [100] serves as a source of search data and relevance updates with a network [105] functioning as the distribution framework. The distribution framework might be a cable television network, a satellite television network, an IP-based network, or any other type of widely-used networking framework. It may be a wired network or a wireless network, or a hybrid network that uses both of these communication technologies. The search devices are preferably hand-held devices with limited display and input capabilities, such as a hand-held PDA [101], a remote control [115b] that interfaces with a television [115a], or any other input- and output-constrained mobile device (e.g., a cellular phone).

Figure 2:
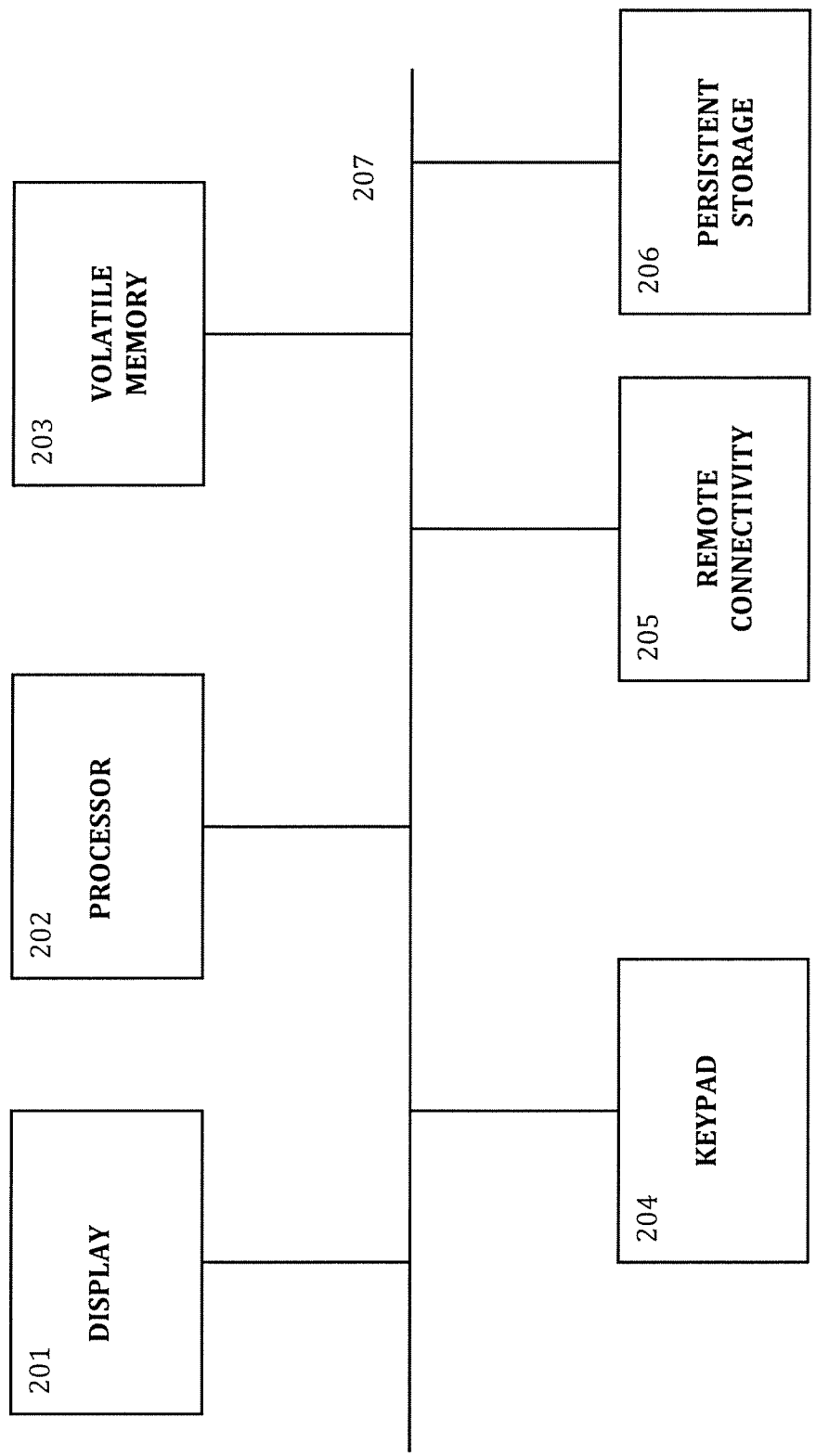
FIG. 2 is a schematic diagram that depicts the various components of a user device, according to certain embodiments of the invention.

FIG. 2 is a diagram that depicts the various components of a user device, according to certain embodiments of the invention. The user device communicates with the user via a display [201] and a keypad [204]. This keypad may be an overloaded keypad that produces ambiguous text input.

Computation is performed using a processor [202] that stores temporary information in a volatile memory store and persistent data in a persistent memory store [206]. Either or both of these memory stores may hold the computer instructions for the processor to perform the logic described herein. The device is operable to connect to a remote system using a remote connectivity module [205].

Figure 3:
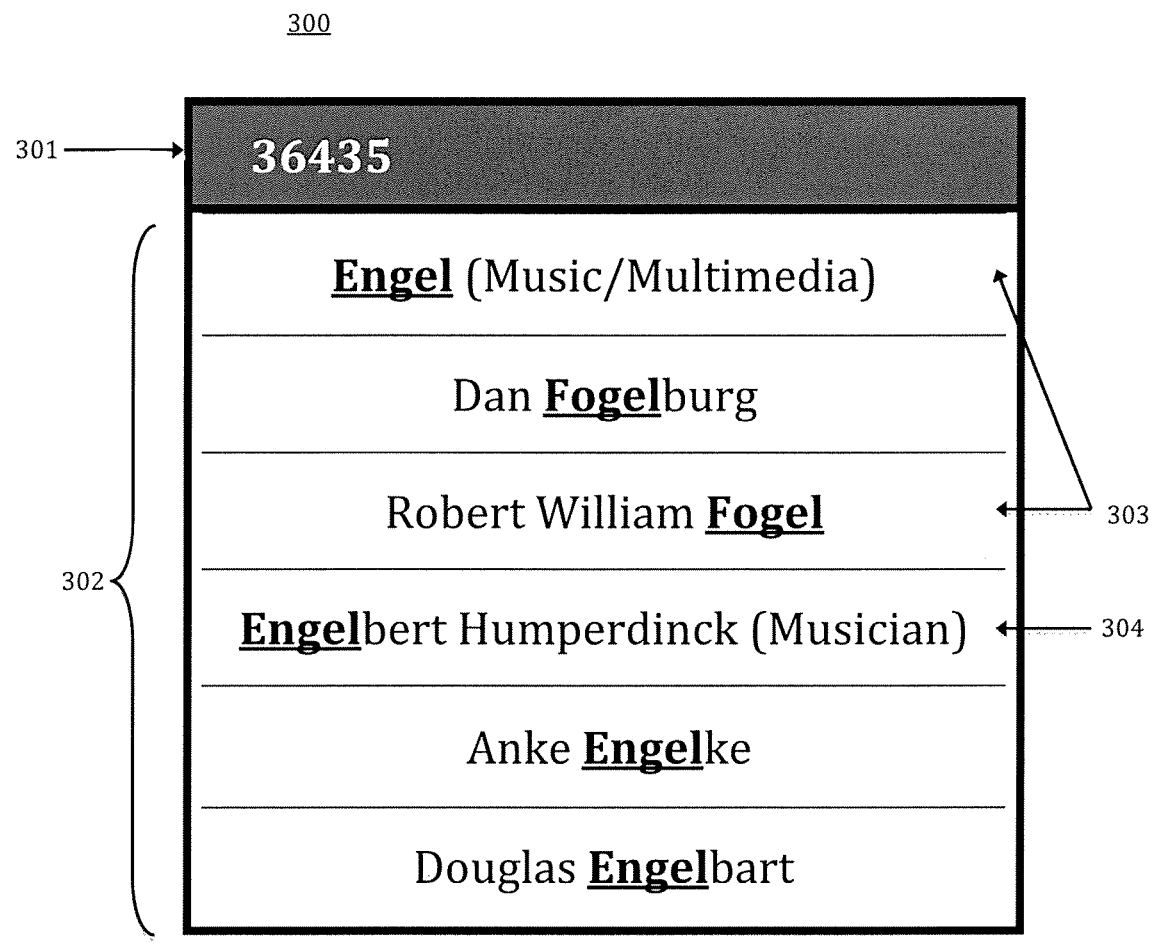
FIG. 3 is a user-interface diagram that depicts the various components of the search interface, according to certain embodiments of the invention.

FIG. 3 is a user-interface diagram that depicts the various components of the search interface, according to certain embodiments of the invention. Box [300] represents the screen of the user device. At the top of the screen is the query input box [301]. As described above, the query input box displays the current contents of the search-query data structure. In FIG. 3, the search-query consists of the ambiguous query term corresponding to the keystrokes "36435" on an overloaded telephone-style keypad, where each number key is associated with multiple characters. The portion [302] of the screen below the query input box [301] is used to display the contents of the result-list. If the result-list is empty, no results are displayed. Otherwise, this portion of the screen [302] is subdivided into rows [303], each of which displays information about a particular search result. In addition to the title of the result, this information may include metadata relevant to the result. In fact, the title of the result is itself only one example of metadata relevant to the result. For example, in FIG. 3 the words "(Music/Multimedia)" appear next to "Engel" in order to provide additional context to the user. The user may use a keyboard navigation interface to browse through the result-list. When the user navigates to a particular row, that row is highlighted. When none of the rows are selected, the query input box is highlighted (illustrated in FIG. 3 as a shaded background with white text [301]).

As described above, the techniques described herein may be used with devices that have overloaded keypads. In FIG. 3, the ambiguous and incomplete search term "36435" has been entered using an overloaded numeric telephone keypad. Using the techniques described in the patent applications referenced above, the system may automatically generate various completions and disambiguations of the search query. In this example, both "engel" and "fogel" are selected as possible disambiguations of "36435," and the set of suggested completions includes "Fogelburg," "Engelbert," and "Engelke," among others. The portion of the suggested completion that matches the ambiguous query term is here shown in boldface and underlined.

Figure 4:
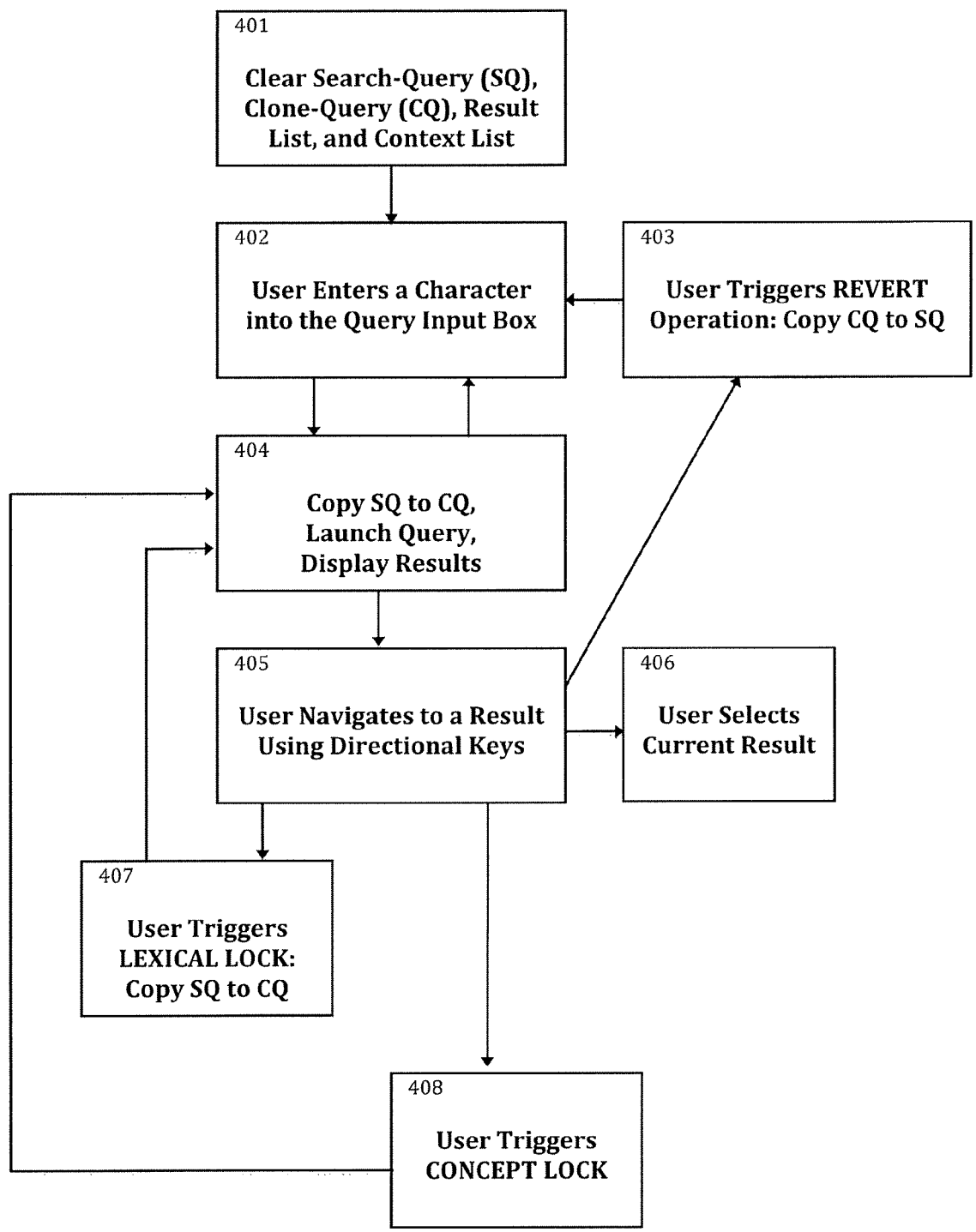
FIG. 4 is a flowchart that illustrates the operation of a search system, according to certain embodiments of the invention.

FIG. 4 is a flowchart that illustrates the operation of a search system, according to certain embodiments of the invention. When the system is initialized, the search-query, the clone-query, the result-list, and the context-list are empty [401]. Although not shown in FIG. 4, the search interface optionally provides a means for the user to return to this initial state at any time during the search process. At this point, the system waits for the user to begin searching by entering [402] a character into the query input box [301]. After the user enters a character, it is added to the search-query. If the rightmost query term in the search-query is a direct-input query term, the character is appended to this query term. The user may begin entering a new direct-input query term by inserting a space (or any other appropriate delimiter). Following the user's character entry, the new search-query is optionally submitted to the search engine [404], without requiring the user to explicitly launch the query. At this point, the contents of the search-query are copied to the clone-query, and the results of the search are displayed [404].

At this point, the user may enter another character to further refine the search query [402] or navigate [405] to one of the displayed results [304]. When the user navigates to a displayed result, the result is highlighted, and the incomplete or ambiguous terms in the search-query are synchronized to the highlighted result. In the context of FIG. 3, the user's navigating to the "Engelbert Humperdinck" result [304] would cause the search query to change from "36435" to "Engelbert Humperdinck." Only the search-query is synchronized to the highlighted result; the clone-query remains unchanged. If the user navigates to a different result, the search-query is restored from the contents of the clone-query and re-synchronized to the newly highlighted result. The process of synchronization is described in more detail below.

Having navigated [405] to a search result, the user is presented with four options. First, if desired, the user may select the highlighted result [406]. In preferred embodiments, selecting the result might instruct the system to retrieve the associated document and open it using an appropriate application. For example, depending on the type of result selected, the system might retrieve and open it using a web-browser, a video player, a text reader, etc.

Second, the user may trigger a REVERT operation [403]. This option will cause the contents of the clone-query to be copied into the search-query, restoring it to its original state. Also, it will un-highlight the currently highlighted result and more the input focus back to the query input box. Thus, a REVERT operation returns the search interface to the state it was in before the user navigated to a specific search result [405].

Third, the user may trigger a LEXICAL LOCK operation [407]. The user may perform a LEXICAL LOCK in order to accept the synchronized search-query and launch a new query using the disambiguated terms. This option will cause the contents of the search-query to be copied into the clone-query. After this occurs, it is no longer possible to restore the initial, ambiguous search-query using a REVERT operation. As described above, navigating to the "Engelbert Humperdinck" result in FIG. 3 would cause the search-query to synchronize to "Engelbert Humperdinck." If, at this point, the user were to trigger a LEXICAL LOCK operation, a new search for the unambiguous term "Engelbert Humperdinck" would be performed, eliminating disambiguations like "Engel" and partial matches like "Fogelburg." The LEXICAL LOCK operation is further described below.

Fourth, the user may choose to trigger a CONCEPT LOCK operation [408]. A CONCEPT LOCK is intended to address situations in which metadata fails to sufficiently distinguish results that represent fundamentally different "concepts." For example, the query terms "Engelbert Humperdinck" might refer to Engelbert Humperdinck the popular singer born in 1936, or they might refer to Engelbert Humperdinck the well-known composer of German Opera who lived in the 19$^{th}$ century. In this case, topical metadata may be unable to distinguish between these two possibilities, since both Engelbert Humperdincks would likely be indexed under terms like "Composer," "Musician," "Singing," etc.

To overcome this problem, search results are manually associated with Global Identifiers (GIDs) that correspond to various "concepts." These identifiers make it possible to distinguish between two separate concepts that happen to be associated with similar metadata. For example, Engelbert Humperdinck the singer might be associated with GID 500, while results about Engelbert Humperdinck the composer might have GID 510. Navigating to a result with GID 500 and triggering a CONCEPT LOCK will cause the selected GID (i.e. 500) to be stored in the context-list. Preferably, when launching a query, the system will pass the contents of the context-list to the search engine, thereby ensuring that only results related to GID 500 will be returned. Results about Engelbert Humperdinck the composer, though they may be associated with similar metadata, will not be included in the result-list because they are not associated with GID 500. The synchronization process and the LEXICAL LOCK and CONCEPT LOCK operations are further illustrated below.

Figure 5:
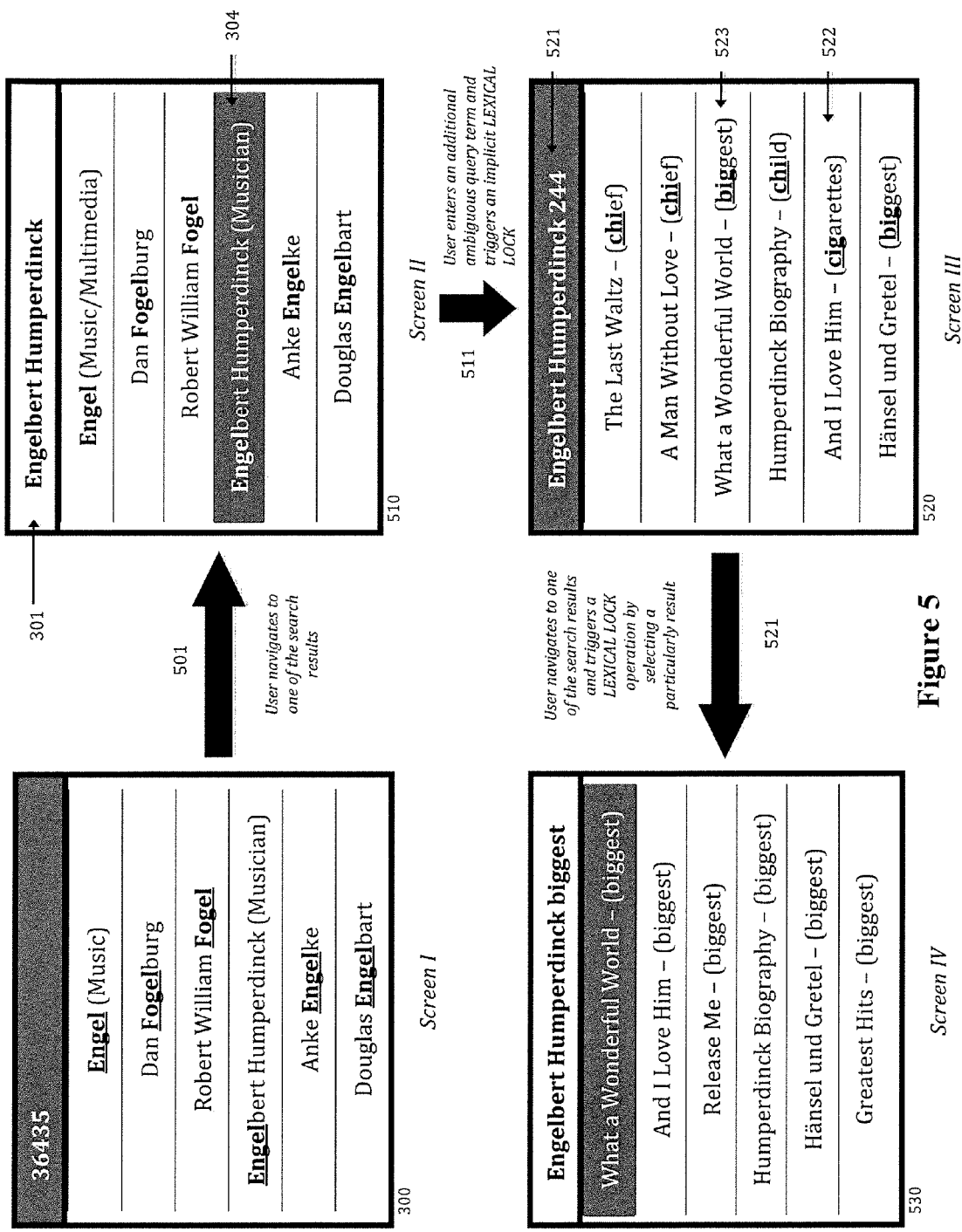
FIG. 5 is a user interface diagram that illustrates the operation of the navigation, synchronization, and LEXICAL LOCK features, according to certain embodiments of the invention.

FIG. 5 is a user interface diagram that illustrates the operation of the navigation, synchronization, and LEXICAL LOCK features described above. Screen I [300] shows the search interface as it appeared in FIG. 3. The user may then use the device's keypad to navigate [501] to the "Engelbert Humperdinck" result. As shown in Screen II [510], this result is highlighted [304], and the search-query (displayed in the query input box [301]) is synchronized to "Engelbert Humperdinck." During the synchronization process, each direct-input query term in the search-query that matches a complete and unambiguous term (or phrase, such as "Engelbert Humperdinck") in the highlighted result's metacontent is removed and the corresponding complete and unambiguous term (or phrase) is put in place of the corresponding direct-input query term as a locked query term. Thus, because "Engelbert Humperdinck" matches "36435," the direct-input query term "36435" is replaced by the locked query term "Engelbert Humperdinck" in the search-query.

Having navigated to the highlighted result [304], the user may enter more ambiguous characters [521]. This automatically moves the focus (i.e., the highlighted item) to the query input box, and the ambiguous characters "244" are added to the end of the search-query. This also performs an implicit LEXICAL LOCK on the query term "Engelbert Humperdinck." The search system automatically launches the new search-query in the search engine and returns results that are related to the locked query term "Engelbert Humperdinck" and the ambiguous query term "244." The state of the interface after this search is shown in Screen III [520]. At the end of each row, the system may optionally display the metadata matched by the ambiguous query term. For example, after the result "And I Love Him" [522], the word "cigarettes" appears in parentheses, indicating that this result was selected because it is associated with "cigarettes," which matches the ambiguous query term "244." Optionally, the portion of the metadata that matches the ambiguous query term may be set-off from the rest of the text. In Screen III [520], the matching portion of the metadata is underlined.

To fully disambiguate the search-query, the user may perform a LEXICAL LOCK operation. In the scenario shown in FIG. 5, the user navigates to the "What a Wonderful World" result and triggers a LEXICAL LOCK [521]. As described above, navigating to the "What a Wonderful World" result causes the search-query to synchronize its direct-input query terms to the corresponding locked query terms. In this case, the direct-input term "244" is synchronized to "biggest." The LEXICAL LOCK operation makes this change permanent, fully disambiguating the search-query, as shown in Screen IV [530].

Figure 6:
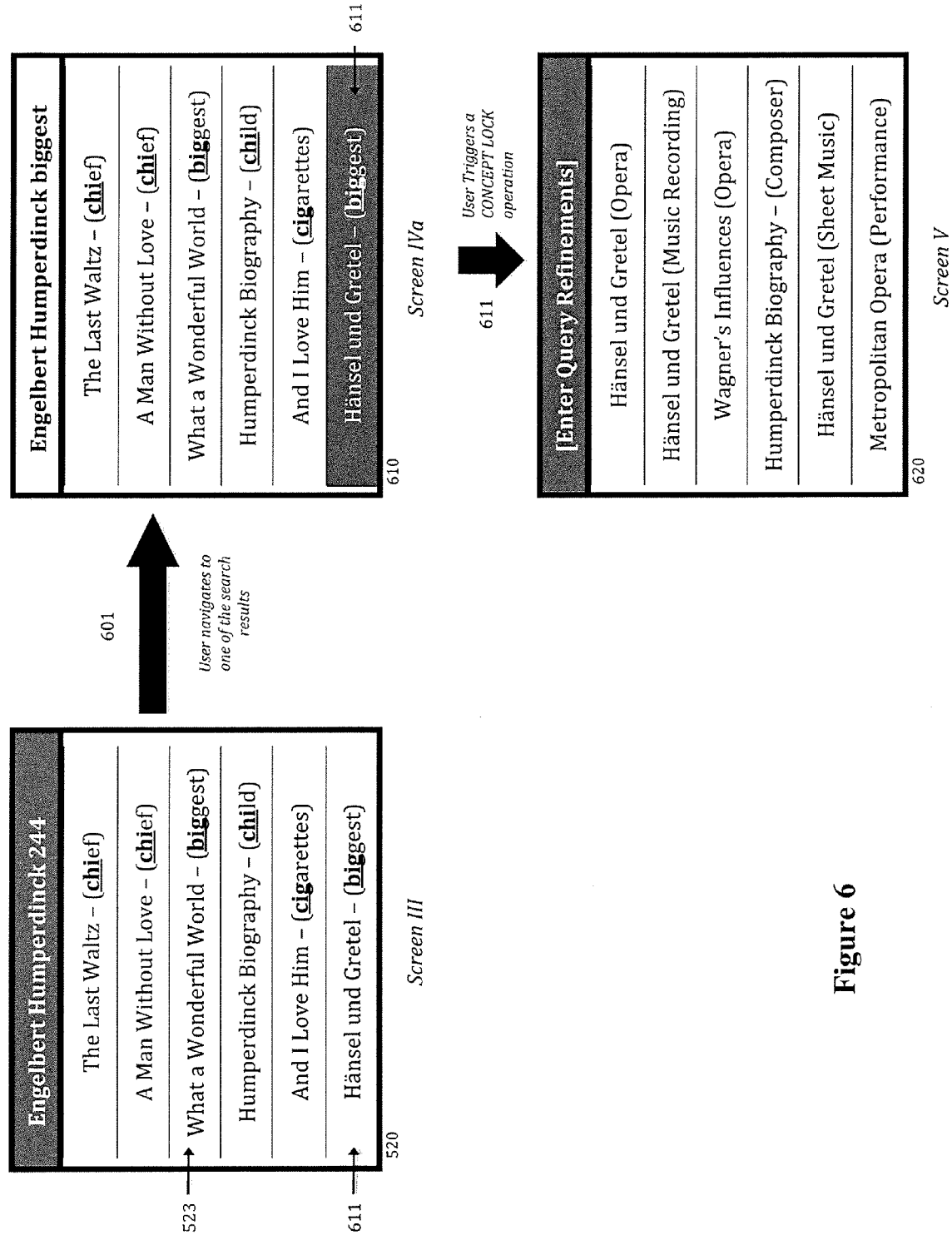
FIG. 6 is a user interface diagram that illustrates the operation of the CONCEPT LOCK feature, according to certain embodiments of the invention.

FIG. 6 is a user interface diagram that illustrates the operation of the CONCEPT LOCK feature. Screen III [520] (identical to Screen III in FIG. 5) lists results that are relevant to the locked query term "Engelbert Humperdinck" and the direct-input term "244." This listing includes terms that are relevant to Humperdinck the popular singer (e.g. "What a Wonderful World" [523], the title of a song performed by Humperdinck) and also terms that are relevant to Humperdinck the German composer (e.g., "Hänsel und Gretel" [611], the name of his most famous opera). As explained above, it is difficult to distinguish between these two concepts using metadata alone. This type of distinction is facilitated by the CONCEPT LOCK operation.

For example, in FIG. 6, suppose the user is searching for results related to Humperdinck the composer and not Humperdinck the singer. In order to narrow the scope of the search to the composer, the user would first navigate to a search result related to the desired concept [601]. In this case, the user selects the result titled "Hänsel und Gretel" [611]. Screen IVa [610] depicts the state of the interface after the user has navigated to this result.

At this point, the user triggers a CONCEPT LOCK [611], which limits the query to concepts related to the selected result. As explained above, search terms may be associated with an arbitrary number of GIDs that correspond to various concepts. When the system performs a CONCEPT LOCK, the GIDs associated with the current result are added to the context-list. For example, performing a CONCEPT LOCK on "Hänsel und Gretel" might add the GID corresponding to the concept "Humperdinck the German Composer" to the context-list. By limiting future searches to this concept, the system is able to filter out unwanted search results about Engelbert Humperdinck the popular singer. CONCEPT LOCK operations may be performed explicitly (e.g., in response to the user pressing a button) or implicitly by the search system.

The database used to associate concept GIDs with search terms may be stored and maintained by either the search engine or the client device. If maintained by the search engine, the client device would submit the current context-list to the search engine together with the search-query. The search engine would then return only those results that are relevant to the concept GIDs contained in the context-list. Alternatively, the client device may maintain a database of GIDs in which each GID is associated with a set of pre-constructed queries. In this case, the client device will send these pre-constructed queries to the search engine along with the search-query in order to limit the search results.

It will be appreciated that the scope of the present invention is not limited to the above-described embodiments, but rather is defined by the appended claims; and that these claims will encompass modifications of and improvements to what has been described.

What is claimed is:

1. A user-interface method for selecting a subset of items from a collection of items in response to search criteria including keystrokes entered by a user from a keypad with overloaded keys and including unambiguous metadata associated with a previously selected search result, the method comprising:
   a. receiving a sequence of keystrokes entered by a user, each keystroke of the sequence associated with an overloaded key of a keypad, in which a given overloaded key is in fixed association with a plurality of alphabetical and numerical symbols, wherein the user is using the symbols to search for desired items and each keystroke of an overloaded key of the sequence represents any of the plurality of alphabetical and numerical symbols in fixed association with that overloaded key;
   b. in response to receiving the keystrokes, performing a first search operation on the collection of items based on the sequence of keystrokes to retrieve a first subset of items from the collection of items and corresponding unambiguous metadata associated with the first subset of items, wherein the unambiguous metadata associated with each item of the first subset of items matches a permutation of the pluralities of alphabetical and numerical symbols in fixed association with each overloaded key associated with each keystroke of the sequence of keystrokes;

c. presenting on a display device the first subset of items;

d. receiving a selection of one of the items of the first subset of items from the user;

e. in response to a locking operation received from the user, performing a second search operation on the collection of items based on at least a portion of the unambiguous metadata associated with the selected item to retrieve a second subset of items from the collection of items, wherein at least a portion of the unambiguous metadata associated with each item of the second subset of items matches the portion of the unambiguous metadata associated with the selected item; and f. presenting on the display device the second subset of items.

2. The method of claim 1, wherein the unambiguous metadata term associated with the selected item lexically disambiguates the items of the first subset from each other for the subsequent searching and presenting steps.

3. The method of claim 1, wherein the unambiguous metadata term associated with the selected item is a metadata term describing a concept associated with the selected item of the first subset so that only items associated with the concept of the selected item are selected and presented in the subsequent searching and presenting steps.

4. The method of claim 1, further comprising: receiving a browse action from the user for highlighting one of the presented items of the first subset; and, in response to the user browse action, transforming at least part of the keystrokes into at least one unambiguous metadata term associated with the highlighted item, wherein at least some of the characters of the unambiguous metadata term match the alphabetical and numerical symbols in fixed association with the keystrokes entered by the user.

5. The method of claim 1, wherein the receiving a selection of one of the items of the first subset of items includes receiving a browse action from the user for highlighting one of the presented items of the first subset and wherein receiving a locking operation from the user includes receiving at least one additional keystroke entry from the user.

6. The method of claim 5, wherein the at least one additional keystroke entry from the user is a keystroke for performing an explicit lock operation.

7. The method of claim 5, wherein the at least one additional keystroke entry from the user includes additional keystrokes entered by the user for providing additional alphabetical or numerical symbols for searching for desired items.

8. A user-interface system for selecting a subset of items from a collection of items in response to search criteria including keystrokes entered by a user from a keypad with overloaded keys and including unambiguous metadata associated with a previously selected search result, the system comprising instructions encoded on one or more non-transitory computer-readable media and when executed operable to:

a. receive a sequence of keystrokes entered by a user, each keystroke of the sequence associated with an overloaded key of a keypad, in which a given overloaded key is in fixed association with a plurality of alphabetical and numerical symbols, wherein the user is using the symbols to search for desired items and each keystrokes of an overloaded key of the sequence represents any of the plurality of alphabetical and numerical symbols in fixed association with that overloaded key;

b. in response to receiving the keystrokes, perform a first search operation on the collection of items based on the sequence of keystrokes to retrieve a first subset of items from the collection of items and corresponding unambiguous metadata associated with the first subset of items, wherein the unambiguous metadata associated with each item of the first subset of items matches a permutation of the pluralities of alphabetical and numerical symbols in fixed association with each overloaded key associated with each keystroke of the sequence of keystrokes;

c. present on a display device the first subset of items;

d. receive a selection of one of the items of the first subset of items from the user;

e. in response to a locking operation received from the user, perform a second search operation on the collection of items based on at least a portion of the unambiguous metadata associated with the selected item to retrieve second subset of items from the collection of items, wherein at least a portion of the unambiguous metadata associated with each item of the second subset of items matches the portion of the unambiguous metadata associated with the selected item; and f. present on the display device the second subset of items.

9. The system of claim 8, wherein the unambiguous metadata term associated with the selected item lexically disambiguates the items of the first subset from each other for the subsequent searching and presenting steps.

10. The system of claim 8, wherein the unambiguous metadata term associated with the selected item is a metadata term describing a concept associated with the selected item of the first subset so that only items associated with the concept of the selected item are selected and presented in the subsequent searching and presenting steps.

11. The system of claim 8, further comprising instructions operable to receive a browse action from the user for highlighting one of the presented items of the first subset; and instructions operable to, in response to the user browse action, transform at least part of the keystrokes into at least one unambiguous metadata term associated with the highlighted item, wherein at least some of the characters of the unambiguous metadata term match the alphabetical and numerical symbols in fixed association with the keystrokes entered by the user.

12. The system of claim 8, wherein the instructions operable to receive a selection of one of the items of the first subset of items is further operable to receive a browse action from the user for highlighting one of the presented items of the first subset and wherein the instructions operable to receive a locking operation from the user is further operable to receive at least one additional keystroke entry from the user.

13. The system of claim 12, wherein the at least one additional keystroke entry from the user is a keystroke for performing an explicit lock operation.

14. The system of claim 12, wherein the at least one additional keystroke entry from the user includes additional keystrokes entered by the user for providing additional alphabetical or numerical symbols for searching for desired items.

* * * * *